(12) United States Patent
Beverly et al.

(10) Patent No.: US 12,035,700 B1
(45) Date of Patent: Jul. 16, 2024

(54) SMART FISHING ROD

(71) Applicants: Mark Beverly, Christi, TX (US);
Michella Beverly, Christi, TX (US)

(72) Inventors: Mark Beverly, Christi, TX (US);
Michella Beverly, Christi, TX (US)

( * ) Notice: Subject to any disclaimer, the term of this patent is extended or adjusted under 35 U.S.C. 154(b) by 147 days.

(21) Appl. No.: 17/676,671

(22) Filed: Feb. 21, 2022

Related U.S. Application Data (60) Provisional application No. 63/151,305, filed on Feb. 19, 2021.

(51) Int. Cl.
*A01K 87/00* (2006.01)
*A01K 97/12* (2006.01)

(52) U.S. Cl.
CPC .......... *A01K 87/007* (2013.01); *A01K 97/125* (2013.01)

(58) Field of Classification Search
CPC ...... A01K 97/125; A01K 97/12; A01K 97/00; A01K 87/00; A01K 87/007
See application file for complete search history.

(56) References Cited

U.S. PATENT DOCUMENTS

| | | |
|---|---|---|
| 7,131,231 B1 | 11/2006 | Lee |
| 2006/0265931 A1 | 11/2006 | Mcfadden et al. |

*Primary Examiner* — Joshua J Michener
*Assistant Examiner* — Henry Hooper Mudd
(74) *Attorney, Agent, or Firm* — Sanchelima & Associates, P.A.; Christian Sanchelima; Jesus Sanchelima (57) ABSTRACT

A smart fishing rod includes a rod assembly, a spring assembly, and a magnetic track assembly. In one embodiment, the rod assembly resembles a modular fishing rod that is used in recreational fishing. The spring assembly is mounted towards the handle portion of the rod assembly. Additionally, the spring assembly includes a hooked spring and a nibble spring. The spring assembly is also operatively connected to a plurality of LED lights to notify a user when a fish is caught or nibbles on the line of the rod assembly. When a fish is caught, the magnet track assembly allows for the reel within the sliding reel holder to move back and forth thereby notifying a user that there is a fish on the line.

20 Claims, 11 Drawing Sheets

FIG. 12 i# SMART FISHING ROD

The present application is a U.S. Non-Provisional Patent Application claiming priority of U.S. Provisional Patent Application Ser. No. 63/151,305 filed on Feb. 19, 2021, which is hereby incorporated by reference.

BACKGROUND OF THE INVENTION

Field of the Invention

The present invention relates to a smart fishing rod and, more particularly, to a smart fishing rod that includes an electrical assembly, wherein said electrical assembly further includes devices such as speakers, light system, a device for wireless communication. The smart fishing rod introduces an innovative way of fishing

Description of the Related Art

Several designs for fishing rods have been designed in the past. None of them, however, include electrical components enclosed by modular sections of a fishing rod defining smart modules, meaning that a fisherman can incorporate one of the smart modules to a preexistent fishing rod to make it a smart fishing rod. The smart modules are interchangeable. For instance, a user may incorporate two modules that encloses the batteries for longer use.

Applicant believes that a related reference corresponds to U.S. Pat. No. 7,131,231 issued for a multifunction electronic fishing float having an identification number which automatically generates radio frequency signals. Applicant believes that another related reference corresponds to U.S. patent publication No. 2006/0265931 published for a fish bite or strike alarm which is attachable to multiple types of rod holders. However, the present invention differs from the cited references because they fail to disclose a modular smart fishing rod comprising a rod assembly, a spring assembly, and a magnet track assembly.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a smart fishing rod which accurately notifies a user if a fish is nibbling on the hook of a fishing rod or if a fish has bitten the hook.

It is one of the objects of the present invention to provide a smart fishing rod that can be held by a rod holder and permit a user to leave the rod unsupervised and then notified by means of audible and visual alerts that a fish has bitten the hook.

It is one of the objects of the present invention to provide a smart fishing rod which include smart modules that can be incorporated to preexisting modular fishing rods to make them smart rods.

It is another object of this invention to provide a smart fishing rod which enhances a fishing experience by providing the tools necessary to determine when there is fish activity near the fishing hook.

It is still another object of the present invention to provide a smart fishing rod which is intuitive and easy to use.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Referring now to the drawings, where the present invention is generally referred to with numeral 10, it can be observed that it basically includes a fishing rod assembly 20, an electrical assembly 40, a fastening assembly 60, a spring assembly 80, and a magnetic track assembly 90. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 1:
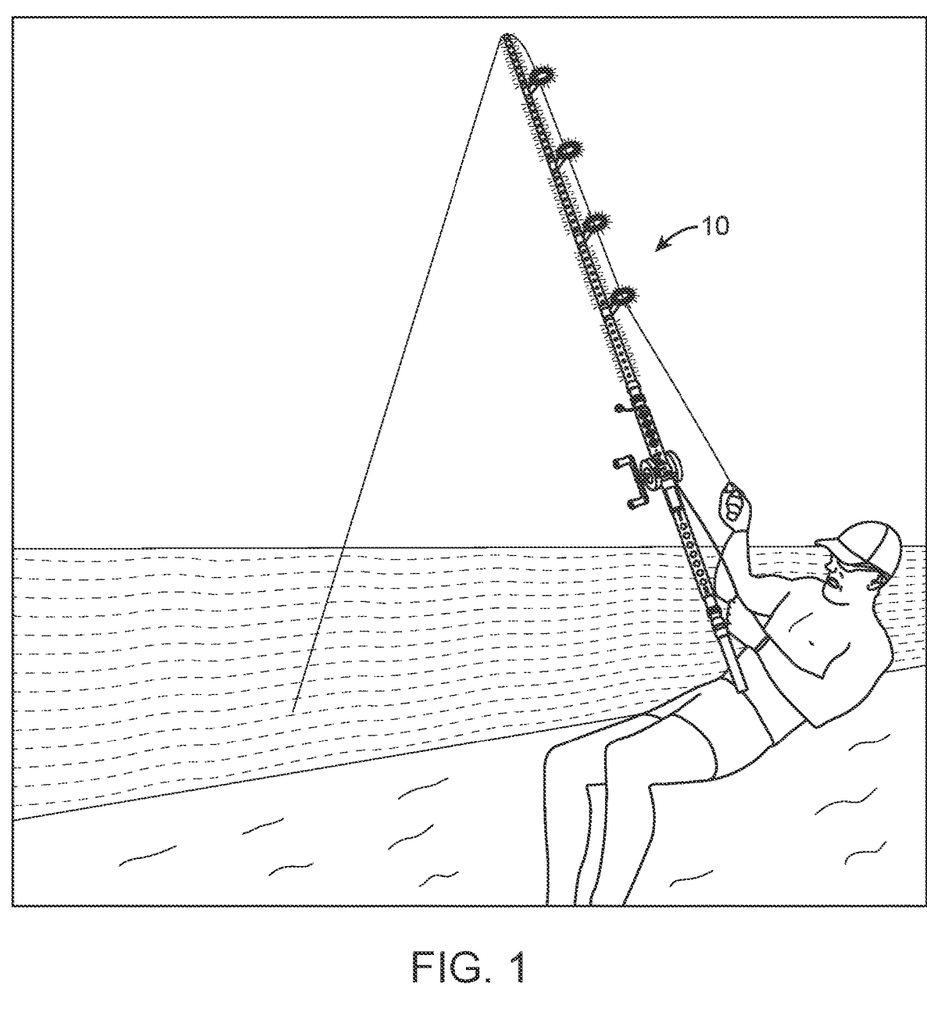
FIG. 1 represents an operational view of a user fishing with the smart fishing rod 10.
Figure 1A:
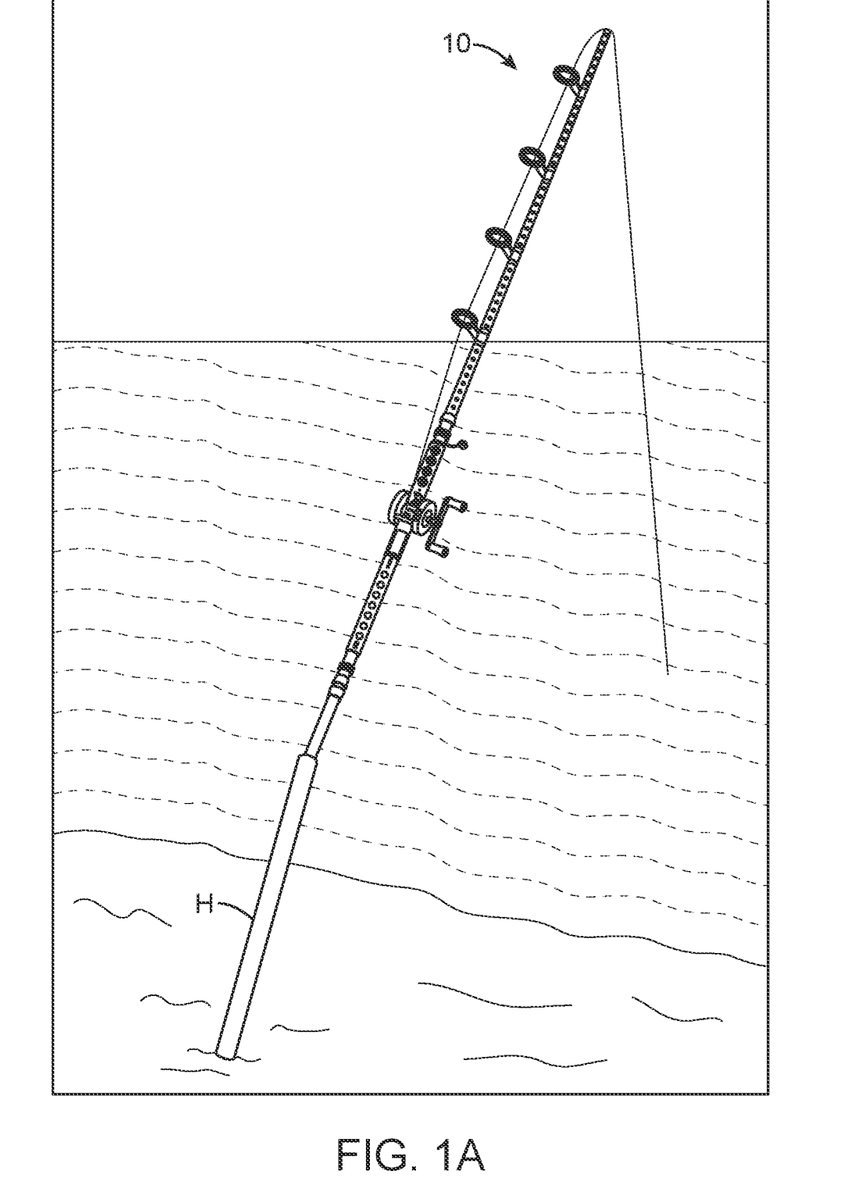
FIG. 1A represents an operational view of the present invention 10 being held by a rod holder H.
Figure 2:
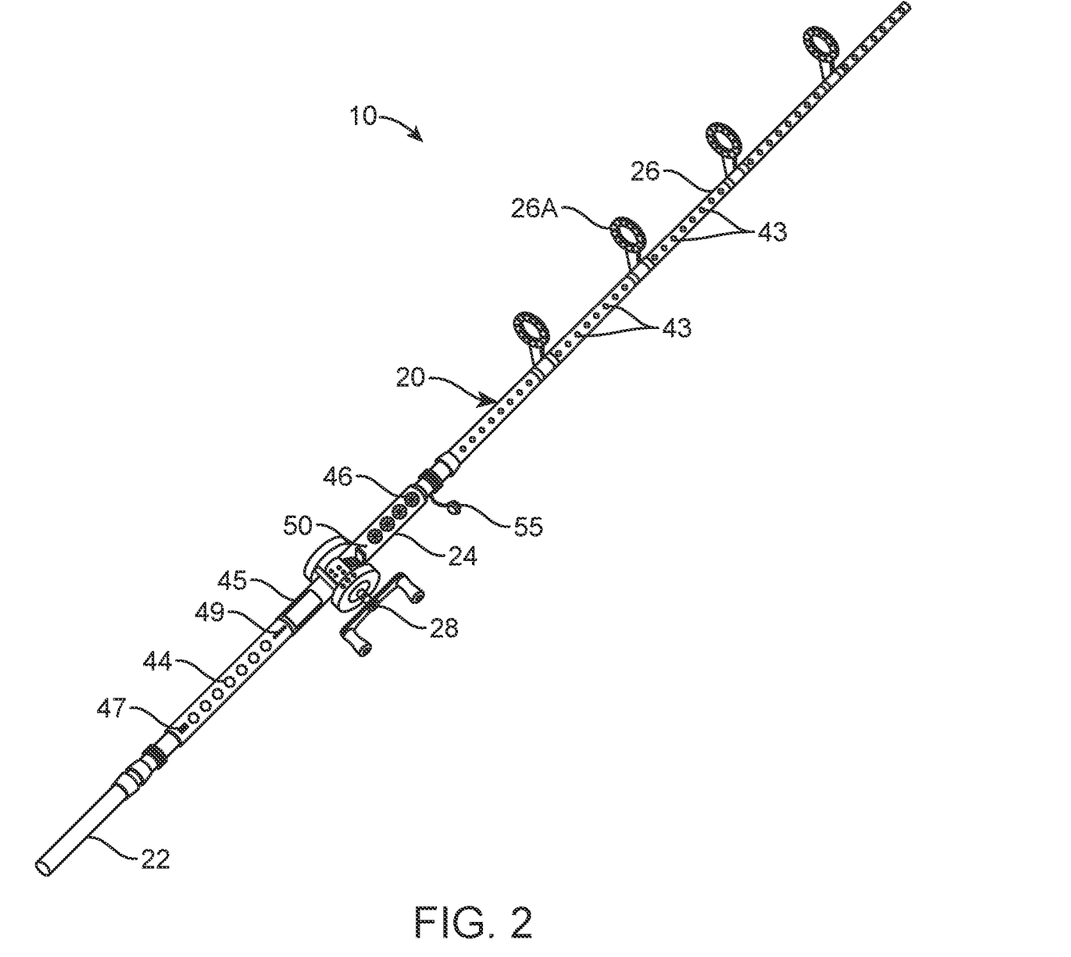
FIG. 2 shows an isometric view of the smart fishing rod 10 in accordance with an embodiment of the present invention.
Figure 3:
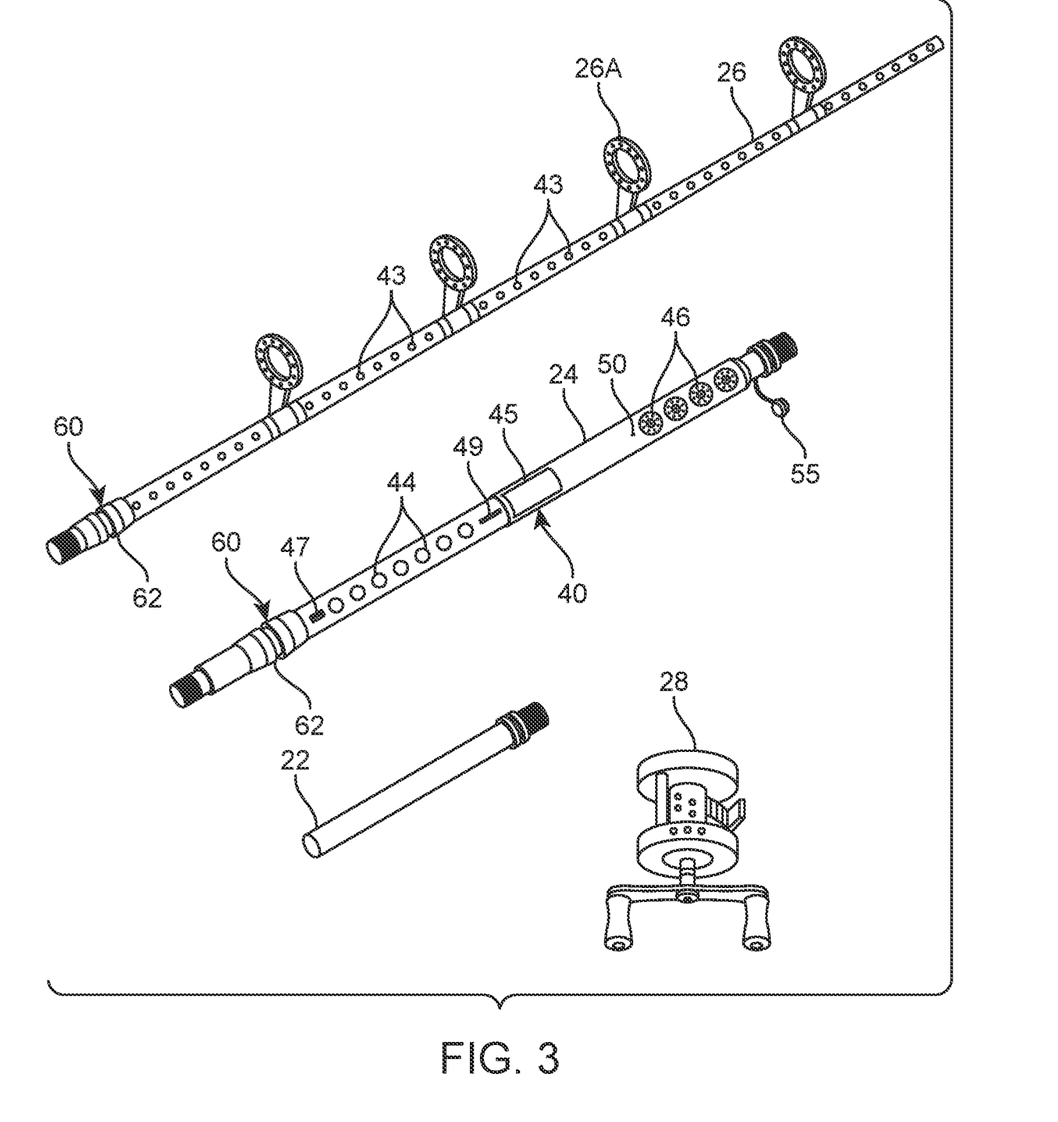
FIG. 3 illustrates an exploded view of the smart fishing rod 10 depicting the handle portion 22, the central portion 24, the reel 28, and the pole portion 26. Ferrules 62 are used to secure each portion together. Wherein said reel 28 is removably attached to said central portion 24.

The fishing rod assembly includes a fishing rod 21. Fishing rod 21 that resembles the fishing rods that are utilized in traditional recreational fishing activities. In different embodiments, the fishing rod 21 may be a spin fishing rod, a casting fishing rod, a telescopic fishing rod, a fly-fishing rod, an ultra-light fishing rod, a surf fishing rod, a trolling fishing rod, an ice fishing rod. It should be understood that the fishing rod is not limited to being any specific variety of fishing rod. Any fishing rod may be implemented into the present system. In a preferred embodiment the fishing rod 21 may include a handle portion 22, a central portion 24, and a pole portion 26 defining a modular fishing rod 21. The fishing rod 21 may be made of a flexible, durable, and sturdy material. Fishing rod 21 may be made of carbon steel, alloy steel, stainless steel, tool steel, brass, bronze, iron, aluminum, nickel-based alloy, ceramics, polymers, fibers, metal alloy, composite materials, fiberglass, graphite, or any variation or combination thereof. The fishing rod 21 may have a predetermined length. In a suitable embodiment, fishing rod 21 may have a substantially elongated cylindrical shape. The handle portion 22 may be volumetrically suitable to be handheld. Handle portion 22 may be ergonomically designed to be comfortable to use. Central portion 24 may have an elongated cylindrical shape. Central portion 24 may be volumetrically suitable to receive electric devices therein. Central portion may be removably attached to the handle portion 21 at a distal end. The pole portion 26 may be removably attached to the central portion 24 at a distal end. Pole portion 26 may be an elongated member which may have a smaller diameter that a diameter of the central portion 24 and the handle portion 22. Pole portion 26 may be larger in length than the central and handle portions (22, 24). In a suitable embodiment the pole portion 26 may include guides 26a. Additionally, pole portion 26 may include generic elements such as tip tops, windings, and the like. The guides 26a may be circular pieces located along said pole portion 26 separated by a predetermined distance. Guides 26 may have a central opening that receives a fishing line therethrough to provide stability. Guides 26a may be made of polymers, metals, ceramics, or the like. In other embodiments, the guides 26a may have a quadrangular shape, an oval shape, an irregular shape, or any variation thereof. A reel 28 may be detachable attached to the central portion 26. The reel 28 may house the fishing line. The reel 28 may be used to wind and stow the fishing line. As depicted in FIG. 3. The handle portion, the central portion, and the pole portion (22, 24, 26) may include threaded portions which receive fasteners to secure the portions (22, 24, 26) together.

The fastening assembly 60 includes ferrules 62. Ferrules 62 may be made of a resistant, durable, and sturdy material. Ferrules 62 may be made of carbon steel, alloy steel, stainless steel, tool steel, brass, bronze, iron, aluminum, nickel-based alloy, ceramics, polymers, fibers, metal alloy, composite materials, fiberglass, graphite, or any variation or combination thereof. Ferrules 62 may have a cylindrical shape. Ferrules 62 may be male ferrules or female ferrules. Male ferrules may fit into the join of another piece. Female ferrule may receive the male ferrule. Ferrules 62 may be used to ensemble together the handle portion, the central portion, and the pole portion (22, 24, 26). Ferrules 62 may be attached to distal ends of said handle portion 22, central portion 24, and pole portion 26.

Figure 4:
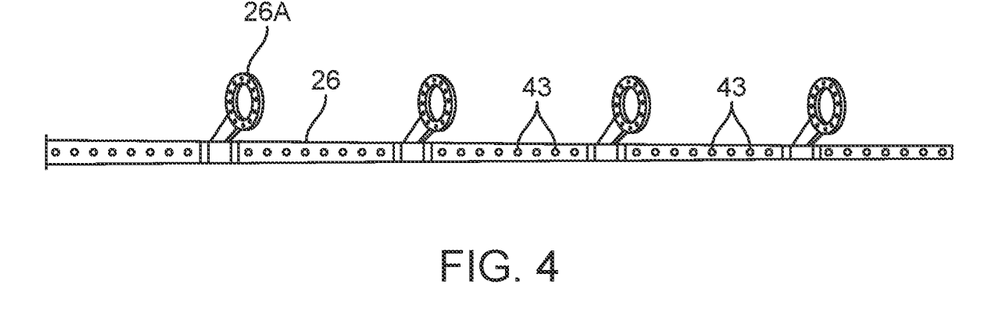
FIG. 4 is an enlarged view of the pole portion 26 depicting the lights mounted thereon 43.
Figure 5:
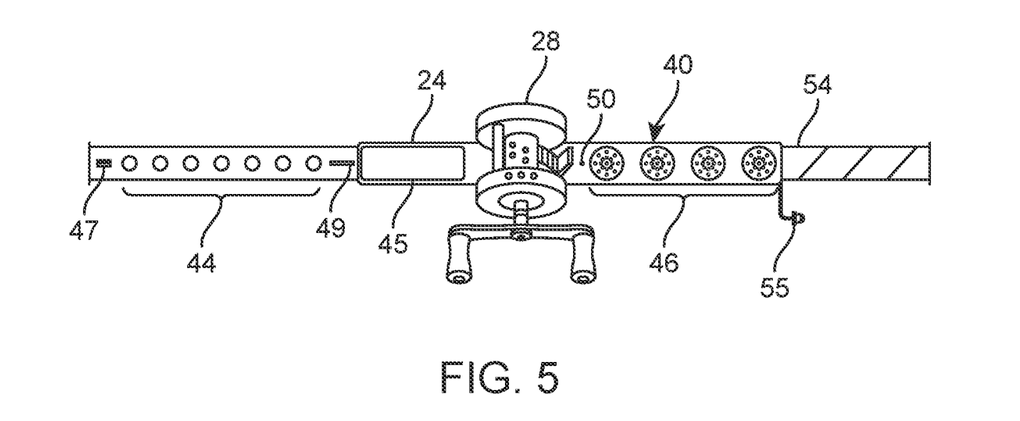
FIG. 5 illustrates an enlarged view of the central portion 22 having elements of the electrical assembly 40 and the reel 28 attached thereon.
Figure 6:
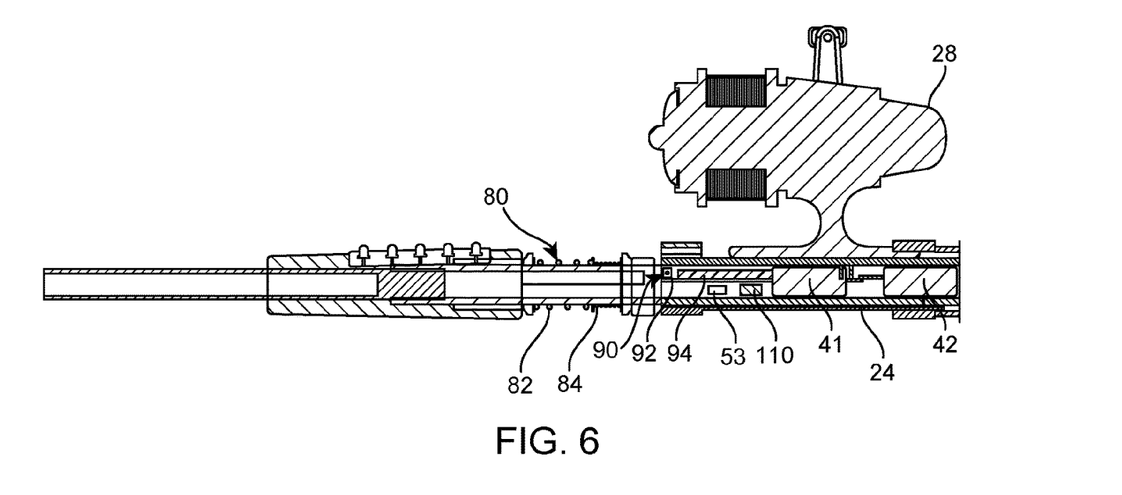
FIG. 6 depicts a cross-sectional view of the central portion 24 and the reel 28.
Figure 7:
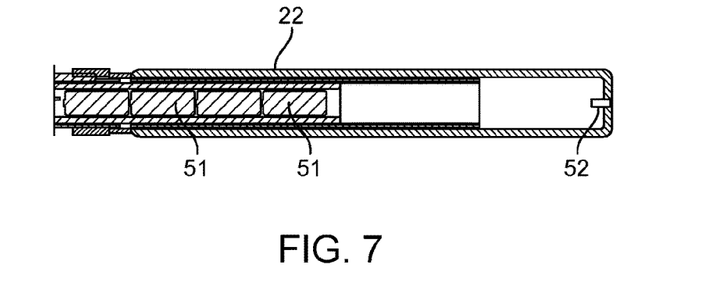
FIG. 7 illustrates a cross-sectional view of the handle portion 22 enclosing the power cells 51.

The electrical assembly 40 may include a microprocessor 41, a transceiver unit 42, lights 43, buttons 44, a display 45, speakers 46, a USB port 47, electric connectors 48, a memory card slot 49, a microphone 50, and power cells 51, a charging port 52, and a tension sensor 53. The electrical assembly is configured to convert the fishing rod 21 into a smart fishing rod by including technology thereat. In a suitable embodiment, the handle portion 22 may enclose the power cells 51 as depicted in FIG. 7. Power cells 51 may be non-rechargeable such as zinc-carbon battery, magnesium battery, mercury battery, lithium/solid cathode battery, lithium/solid electrolyte battery. In another embodiment the power cells 51 may be rechargeable, a rechargeable power cell may be a nickel cadmium battery. Power cells 51 may supply electric energy to the rest of the components. In a suitable embodiment the handle portion 22 may include a charging port 52. The charging port 52 may be electrically connected to the power cells 51 to recharge the power cells 51 from an external source. Additionally, the electrical assembly 40 may include solar panels 54. Solar panels 54 may be a hardware component mounted onto the fishing rod 21 configured to transform solar energy gathered from a light source to electrical energy. Electrical energy converted by the solar panels 54 may be used to supply voltage and current to the elements of the electrical assembly 40. Furthermore, the electrical energy converted by the solar panels 54 may be used to recharge the power cells 51. Solar panels 54 may provide a suitable charging option for longer bait times. In a suitable embodiment, the solar panels 54 may be mounted onto the central portion, nonetheless, in other embodiments, the solar panels 54 may be mounted onto an exterior surface of the handle portion 22 or the pole portion 26. In a suitable embodiment the solar panels 54 may use perovskite solar cells to convert solar energy into electrical energy. However, it should be understood that said solar panels 53 may be any form of solar cells for the aforementioned purpose. The buttons 44 may be located about an exterior surface of the central portion 24. Each of the buttons 44 may be pushbutton switch, a toggle switch, a selector switch, or any variation thereof. In a suitable embodiment the buttons 44 are placed longitudinally along the central portion in a linear disposition. However, in other embodiments the buttons 44 may be arranged in different dispositions such as a matrix layout, or the like. The buttons 44 may be electrically connected to the microprocessor 41 to perform predetermined actions. In one embodiment the buttons 44 may include a power button to turn on and off the electric elements of the present invention 10, a pair button configured to allow a user to connect an electronic portable device with the smart fishing rod 10 by means of the transceiver unit 42, volume buttons turn up/down the volume of the audible information coming out of the speakers 46. The display 45 may be mounted on the central portion 24. In a suitable embodiment the display 45 may be an organic light-emitting diode (OLED) display. Nonetheless, other variety of displays may be used such as field sequential color LCD display, EBT LCD display, thin-film-transistor LCD display, or any variation thereof. The display 45 may be used to present information in visual form. The display 45 may be powered by the power cells 51. The display 45 may be electrically connected to the microprocessor 41 so the microprocessor 41 may send information to be presented by the display 45. In a suitable embodiment the speaker 46 may be attached to the central portion 24. As depicted in FIG. 5 the speakers 46 may be placed longitudinally along the central portion 46. In other embodiments, the speakers 46 may transversely cover a section of the central portion surface. The speakers 46 may be electrically connected to the microprocessor 41 to provide predetermined audible information. The USB port 47 may be located on the central portion 24 proximal to the buttons 44. Nonetheless, in other embodiments the USB port 47 may be located wheresoever on the central portion 24. The USB port 47 may be an USB-A type port, an USB-C type port, a lightning type port, a micro-USB type port or any variation thereof. The USB port 47 may be electrically connected to the microprocessor 41 to receive and send predetermined information. Camera 55 may be attached to the central portion 24. However, in other embodiments, camera 55 may be attached to a distal end of the pole portion 26. Camera 55 may record video images. Camera 55 may be electrically connected to the display 45 to show video images recorded thereon. Camera 55 may include ultra-wide-angle lens that creates a wide panoramic image. Camera 55 having ultra wide angle lens may be capable of 180° recording. Camera 55 may be suitable to record the fishing process. Camera 55 may be electrically connected to the microprocessor 41. Microprocessor 41 may be configured to receive a video signal from the camera 55. Microprocessor 41 by means of the camera 55 may monitor activity around the hook. When movement around the hook is detected, the microprocessor 41 may actuate the speakers 46 to provide an audible alert to a user notifying them of the activity sensed on the hook of the fishing rod 21. The memory card slot 49 may be suitable to insert a memory card therein and store the videos recorded by the camera 55. The memory card slot 49 may be located on the central portion 24 proximal to the buttons 44, opposite to the USB port 47. The microphone 50 is an electrical device that converts sound into electrical signals. Microphone 50 may be configured to receive voice commands which are acquired and processed by the microprocessor 41 to perform predetermined functions. The transceiver unit 42 may be embedded within the central portion. The transceiver unit 42 may be electrically connected to the microprocessor 41 to send and receive information. The transceiver unit 42 may allow wireless connection between the smart fishing rod 10 and an electronic device such as a smartphone, a laptop, a tablet, or the like. The transceiver unit 42 may receive and send a signal having format of an electromagnetic radiation. Transceiver unit 42 may use wireless technology such as ultrasonic technology, infrared technology, RF technology, Wi-Fi™ technology, Bluetooth™ technology, or any variation thereof. In another embodiment, it can be further implemented as a mobile application to remotely control predetermined functions of the present invention 10. The tension sensor 53 may be connected with the fishing line (not shown in the drawings). The tension sensor 53 may be an analog/digital device that may measure the amount of pulling force/tension that a fish may exert when hooked. The tension sensor 53 may be electrically connected to the microcontroller 41. The tension sensor 53 may generate an electrical signal which may be acquired by the microprocessor 41 to give warnings based on inputs of predetermined tensions measured by the sensor 53. The microprocessor 41 may be embedded within the central portion as depicted in FIG. 6. The microprocessor 41 may be a compact integrated circuit designed to govern predetermined operations on a system. Microprocessor 41 may include a processor, a memory, and input/outputs peripherals. Microprocessor 41 may be the central unit that receives and sends electrical signals to the other components of the electrical assembly 40. The lights 43 may be longitudinally attached to the pole portion 26 as depicted in FIG. 4. Lights 43 may be mounted on the guides 26*a*. Lights 43 may cover a circumference of each guide from the guides 26*a*. The lights 43 may be LED lights. In another embodiment, the lights 43 may be a RGB LED lights in which each LED has its own chip meaning they can be individually triggered for chasing, strobing, and color changing. In another embodiment, the lights 43 may be RGBW LED lights, multicolor LED lights, RGBCCT LED lights, or any variation thereof. The microprocessor 41 may turn the lights 43 to a predetermined color that is related to the force measured by the tension sensor 53. Lights 43 on the pole portion 26 may be actuated to indicate to a user that there has been a nibble on the hook. In a preferred embodiment, as the tension measured by the tension sensor 53 increases the lights 43 on the pole portion 26 may change color starting at a bottom and moving to the tip for a visual effect, the higher the tension measures, the higher the lights 43 may go up.

Figure 8A:
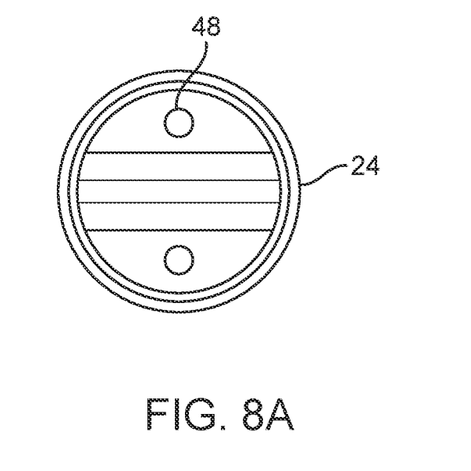
FIG. 8A shows a front view of the central portion having electric connectors 48 thereon to transmit charge and information between portions.
Figure 8B:
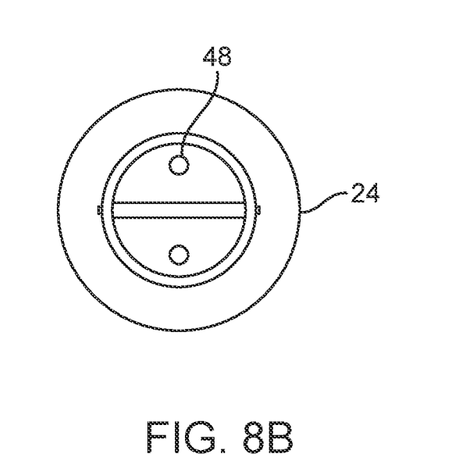
FIG. 8B shows a rear view of the central portion having electric connectors 48 thereon to receive charge and information between portions.
Figure 9:
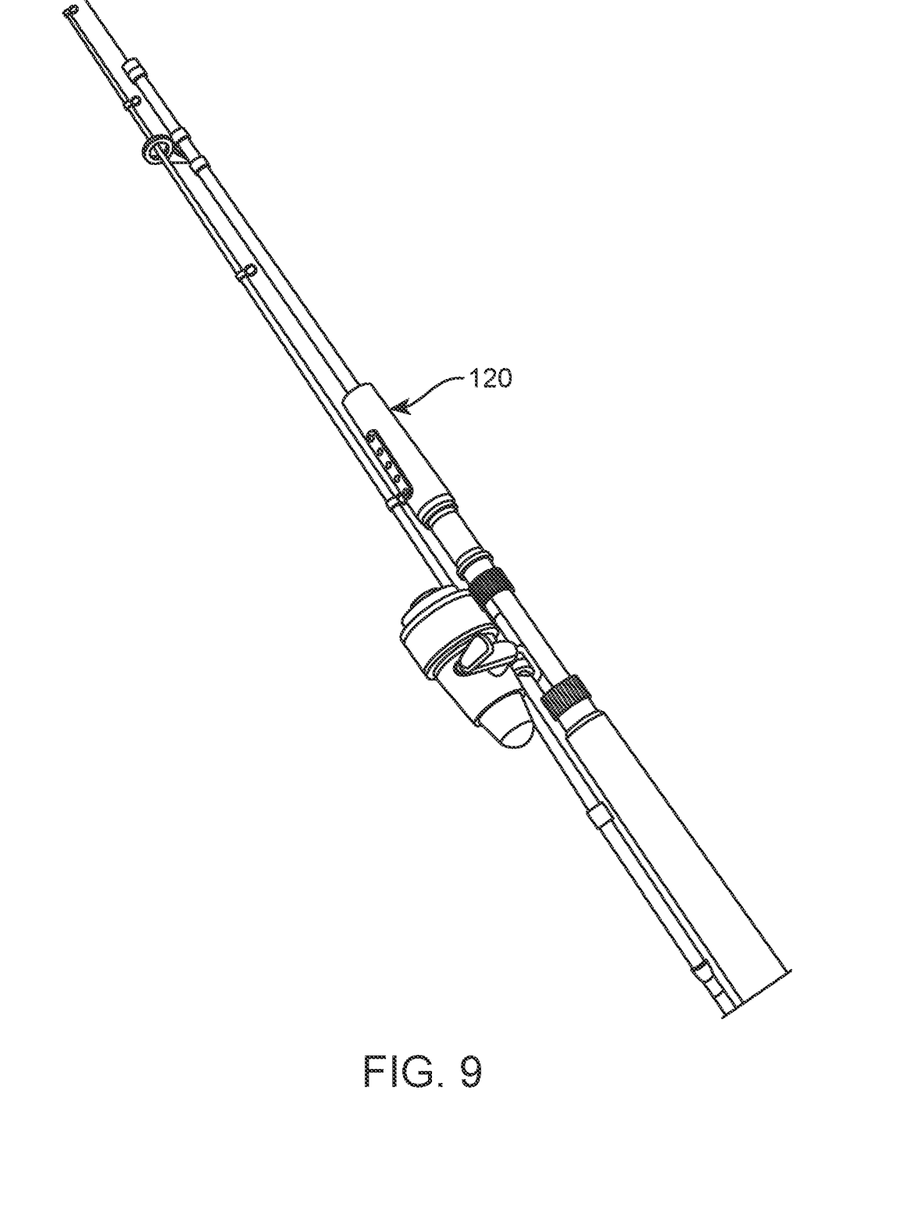
FIG. 9 represents another embodiment of the present invention wherein the smart fishing rod is composed of a single piece 120.
Figure 10:
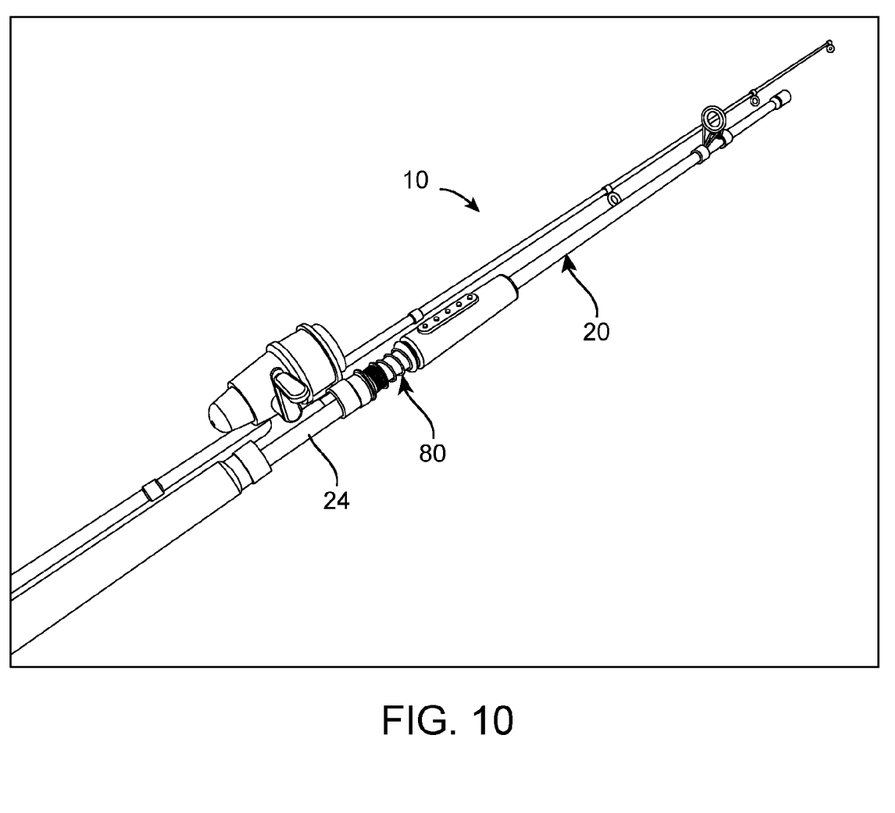
FIG. 10 represents an isometric view of the smart fishing rod 10 in accordance with an embodiment of the present invention.
Figure 11:
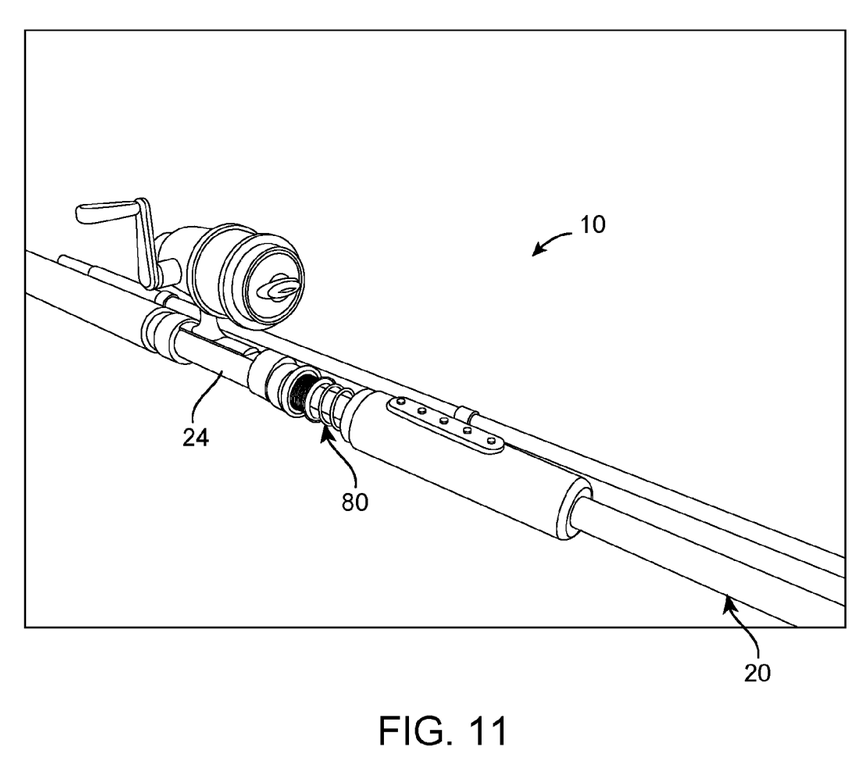
FIG. 11 shows another isometric view of the smart fishing rod 10 in accordance with an embodiment of the present invention.
Figure 12:
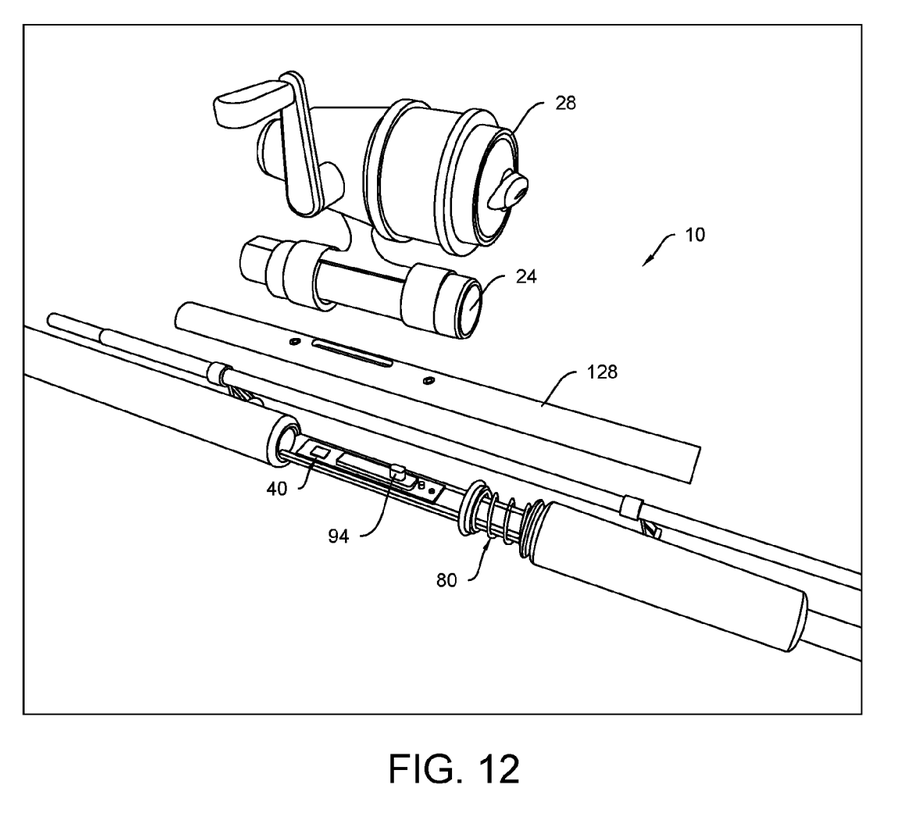
FIG. 12 shows an exploded view of the smart fishing rod 10 in accordance with an embodiment of the present invention.

As depicted in FIGS. 8A-8B, the electric connectors 48 may be internally connected at distal ends of the portions (22, 24, 26). The electric connectors 48 may permit to wirelessly transmit electric power and predetermined information between the portions (24, 22, 26). In one embodiment the present invention may use wireless power transfer technology, wireless power transmission technology, wireless energy transmission technology, or any other suitable means for wirelessly transmitting power as known in the art. In a suitable embodiment a user may be able to connect additional portions enclosing power cells 51 for longer use. The electric connectors may allow a user to implement one of the portions of the smart fishing rod to a preexisting modular rod to make it a smart rod.

Spring assembly 80 includes a hooked spring 82 and a nibble spring 84. In the present embodiment, hooked spring 82 is provided as a spring which has a higher spring constant than that of the nibble spring 84. As a result, the hooked spring 82 requires a substantially greater amount of force to result in displacement. In one implementation, the nibble spring 84 experiences displacement due to the force actuated on the reel line when a fish nibbles on the hook of the fishing rod. As a result, the lights 43 are then actuated to indicate to a user that there has been a nibble on the hook.

Magnetic track assembly 90 includes a magnetic track containing a magnet 92 which is operatively connected with the hooked spring 82. In one embodiment, the hooked spring 82 experiences displacement due to the force of a bite experienced on the fishing hook. As a result, the magnet then moves back and further along the track due to the energy being transferred from the hooked spring 82. Furthermore, the magnetic track 94 is operatively connected to a sliding reel holder 128 (not shown in figures) on the handle portion. The sliding reel holder 128 then causes the reel of the handle to move back and forth corresponding to the movement of the magnet 92 along the magnetic track 94.

In another embodiment, the smart fishing rod 10 may include an actuation mechanism 110 that may be connected to said reel 28 configured to automatically start reeling in when a fish is detected. The actuation mechanism 110 may use the tension sensor 53 as a feedback element to determine the torque that needs to be applied depending on the pulling force detected by the sensor 53.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A smart fishing rod system, comprising:
   a) a fishing rod assembly including a fishing rod with a handle portion;
   b) a spring assembly operatively mounted towards said handle portion of the fishing rod, said spring assembly including a hooked spring and a nibble spring, wherein said spring assembly is operatively connected to lights powered by power cells stored within the handle portion; and
   c) a magnet track assembly including a magnetic track with a magnet disposed within the handle portion, said magnetic track being operatively connected with a sliding reel holder containing a reel, wherein the smart fishing rod system is configured to notify a user if a fish nibbles on a hook by activating the lights or bites the hook by actuating the magnetic track.

2. The smart fishing rod of claim 1, wherein said fishing rod further includes a central portion and a pole portion, the handle portion is removably attached to the central portion, the pole portion is removably attached to the central portion opposite to the handle portion.

3. The smart fishing rod of claim 1, wherein said fishing rod further includes a removably reel.

4. The smart fishing rod of claim 2 further includes an electrical assembly including buttons, a display, speakers, a USB port, electric connectors, a microphone, a transceiver, a tension sensor, the lights, a camera, and a microprocessor.

5. The smart fishing rod of claim 2 further includes a fastening assembly including ferrules, said ferrules secure together said central portion, said handle portion, and said pole portion.

6. The smart fishing rod of claim 4, wherein said buttons, said display, said speakers, said USB port, and said microphone are mounted on said central portion.

7. The smart fishing rod of claim 4, wherein said tension sensor is an analog/digital device that measures the amount of pulling force/tension that a fish may exert when hooked, the tension sensor is electrically connected to the microcontroller, the tension sensor generates an electrical signal which is acquired by the microprocessor to give warnings based on inputs of predetermined tensions measured by the sensor.

8. The smart fishing rod of claim 4, wherein said electric connectors are internally located in distal ends of the handle portion, the central portion, and the pole portion, the electric connectors wirelessly transmit electric power and predetermined information between the central portion, the handle portion, and the pole portion.

9. The smart fishing rod of claim 1, wherein said lights are longitudinally mounted on the pole portion.

10. The smart fishing rod of claim 8, wherein said central portion and said handle portion are interchangeable to add additional power cells for longer wait times.

11. The smart fishing rod of claim 5, wherein said ferrules are attached to said handle portion, said central portion, and said pole portion at distal ends.

12. The smart fishing rod of claim 2, wherein said pole portion includes guides.

13. The smart fishing rod of claim 2, wherein said lights are mounted along said pole portion and on said guides.

14. The smart fishing rod of claim 4, wherein said electrical assembly further includes a camera and a memory card slot, said microprocessor receives a video signal from the camera, said microprocessor by means of the camera monitors activity around the hook, when movement around the hook is detected, the microprocessor actuates the speakers to provide an audible alert.

15. The smart fishing rod of claim 4, wherein said electrical assembly includes solar panels, said solar panels is a hardware component mounted onto the fishing rod configured to transform solar energy gathered from a light source to electrical energy.

16. A smart fishing rod system, comprising:
    a) a fishing rod assembly including a fishing rod having a handle portion, a central portion, and a pole portion, said pole portion includes guides;
    b) a fastening assembly including ferrules, said ferrules are located at distal ends of the central portion, handle portion and pole portion, said ferrules are used to ensemble together the handle portion, the central portion, and the pole portion;
    c) an electrical assembly including buttons, a display, speakers, a USB port, electric connectors, a microphone, a transceiver, a tension sensor, lights, a camera, solar panels, a memory card slot, and a microprocessor, said tension sensor measures the amount of pulling force/tension that a fish may exert when hooked, the tension sensor is electrically connected to the microcontroller, the tension sensor generates an electrical signal which is acquired by the microprocessor to give warnings based on inputs of predetermined tensions measured by the sensor, said lights are mounted along said pole portion including the guides,
    d) a spring assembly operatively mounted towards said handle portion of the fishing rod, said spring assembly including a hooked spring and a nibble spring, wherein said spring assembly is operatively connected to said lights powered by power cells stored within the handle portion;
    e) a magnet track assembly including a magnetic track with a magnet disposed within the handle portion, said magnetic track being operatively connected with a sliding reel holder containing a reel, wherein the smart fishing rod system is configured to notify a user if a fish nibbles on a hook by activating the lights or bites the hook by actuating the magnetic track.

17. The smart fishing rod of claim 16, wherein said solar panels is a hardware component mounted onto the fishing rod configured to transform solar energy gathered from a light source to electrical energy.

18. The smart fishing rod of claim 16, wherein said electric connectors are internally located in distal ends of the handle portion, the central portion, and the pole portion, the electric connectors wirelessly transmit electric power and predetermined information between the central portion, the handle portion, and the pole portion.

19. The smart fishing rod of claim 16, wherein said central portion and said handle portion are interchangeable to add additional power cells for longer wait times.

20. A smart fishing rod, consisting of:
    a) a fishing rod assembly including a fishing rod having a handle portion, a central portion, and a pole portion, said pole portion includes guides;
    b) a fastening assembly including ferrules, said ferrules are located at distal ends of the central portion, handle portion and pole portion, said ferrules are used to ensemble together the handle portion, the central portion, and the pole portion;
    c) an electrical assembly including buttons, power cells, a display, speakers, a USB port, electric connectors, a microphone, a transceiver, a tension sensor, lights, a camera, solar panels, a memory card slot, and a microprocessor, said tension sensor measures the amount of pulling force/tension that a fish may exert when hooked, the tension sensor is electrically connected to the microcontroller, the tension sensor generates an electrical signal which is acquired by the microprocessor to give warnings based on inputs of predetermined tensions measured by the sensor, said lights are mounted along said pole portion including the guides, said electric connectors are internally located in distal ends of the handle portion, the central portion, and the pole portion, the electric connectors wirelessly transmit electric power and predetermined information between the central portion, the handle portion, and the pole portion, said solar panels is a hardware component mounted onto the fishing rod configured to transform solar energy gathered from a light source to electrical energy, electrical energy generated by the solar panels is stored by said power cells;

d) a spring assembly operatively mounted towards said handle portion of the fishing rod, said spring assembly including a hooked spring and a nibble spring, wherein said spring assembly is operatively connected to said lights powered by said power cells stored within the handle portion, said central portion and said handle portion are interchangeable to add additional power cells for longer wait times;

e) a magnet track assembly including a magnetic track with a magnet disposed within the handle portion, said magnetic track being operatively connected with a sliding reel holder containing a reel, wherein the smart fishing rod system is configured to notify a user if a fish nibbles on a hook by activating the lights or bites the hook by actuating the magnetic track, said microprocessor receives a video signal from the camera, said microprocessor by means of the camera monitors activity around the hook, when movement around the hook is detected, the microprocessor actuates the speakers to provide an audible alert.

* * * * *